(12) United States Patent
Kuhn et al.

(10) Patent No.: US 8,994,676 B2
(45) Date of Patent: Mar. 31, 2015

(54) METHOD FOR OPERATING A CONTROL DEVICE, AND CONTROL DEVICE

(75) Inventors: Mathias Kuhn, Berlin (DE); Frank Hauschild, Berlin (DE); Rainer Dehmann, Berlin (DE)

(73) Assignee: Volkswagen AG, Wolfsburg (DE)

( * ) Notice: Subject to any disclaimer, the term of this patent is extended or adjusted under 35 U.S.C. 154(b) by 435 days.

(21) Appl. No.: 13/504,664

(22) PCT Filed: Oct. 28, 2010

(86) PCT No.: PCT/EP2010/066296
§ 371 (c)(1),
(2), (4) Date: Jul. 5, 2012

(87) PCT Pub. No.: WO2011/051361
PCT Pub. Date: May 5, 2011

(65) Prior Publication Data
US 2012/0268404 A1 Oct. 25, 2012

(30) Foreign Application Priority Data

Oct. 29, 2009 (DE) .......................... 10 2009 051 202

(51) Int. Cl.
*G06F 3/041* (2006.01)
*B60K 37/06* (2006.01)
(Continued)

(52) U.S. Cl.
CPC ................. *B60K 37/06* (2013.01); *B60K 35/00* (2013.01); *G06F 3/0304* (2013.01); *G06F 3/0425* (2013.01); *G06F 3/0481* (2013.01); *G06F 3/0488* (2013.01); *B60K 2350/1012* (2013.01); *B60K 2350/1024* (2013.01); *G06F 2203/04803* (2013.01); *G06F 2203/04806* (2013.01);
(Continued)

(58) Field of Classification Search
CPC ... G06F 3/04865; G06F 3/0487; G06F 3/044; G06F 3/04875; G06F 3/045
USPC ............ 345/173–179, 156; 178/18.01–18.04; 701/408
See application file for complete search history.

(56) References Cited

U.S. PATENT DOCUMENTS 5,731,979 A 3/1998 Yano et al.
2006/0265126 A1 11/2006 Olcott

FOREIGN PATENT DOCUMENTS

DE 10058244 A1 5/2002
DE 102004048956 A1 4/2006
(Continued)

OTHER PUBLICATIONS

Search Report for International Patent Application No. PCT/EP2010/066296; Mar. 4, 2011.
(Continued)

*Primary Examiner* — Kimnhung Nguyen
(74) *Attorney, Agent, or Firm* — Barnes & Thornburg LLP

(57) ABSTRACT

A method for operating a control device, in particular in a vehicle, the control device having a display surface and a control element. A detection region formed in the vicinity of the control element is monitored by a proximity sensing device such that an actuating element is detected in the detection region, and first and second display contents are displayed on the display surface. The first display content is no longer displayed if an actuating element has been detected in the detection region by the proximity sensing device. Also disclosed is a control device for carrying out the method.

15 Claims, 3 Drawing Sheets

(51) Int. Cl.
    *B60K 35/00*         (2006.01)
    *G06F 3/03*          (2006.01)
    *G06F 3/042*        (2006.01)
    *G06F 3/0481*      (2013.01)
    *G06F 3/0488*      (2013.01)

(52) U.S. Cl.
    CPC ................ *G06F2203/04101* (2013.01); *G06F 2203/04106* (2013.01)
    USPC ............ 345/173; 345/156; 345/175; 701/408

(56) References Cited

FOREIGN PATENT DOCUMENTS

| | | |
|---|---|---|
| DE | 102007039445 A1 | 2/2009 |
| WO | 2004078536 A2 | 9/2004 |
| WO | 2009024401 A1 | 2/2009 |

OTHER PUBLICATIONS

Office Action for Korean Patent Application No. 2012-7013544; Jul. 11, 2014.

METHOD FOR OPERATING A CONTROL DEVICE, AND CONTROL DEVICE

PRIORITY CLAIM

This patent application is a U.S. National Phase of International Patent Application No. PCT/EP2010/066296, filed 28 Oct. 2010, which claims priority to German Patent Application No. 10 2009 051 202.0, filed 29 Oct. 2009, the disclosures of which are incorporated herein by reference in their entirety.

FIELD

Embodiments of the present disclosure relate to a method for operating a control device, the control device having a display surface and a control element. In the method, a detection region which is formed in the surroundings of the control element is monitored by a proximity sensing device so that an activation element is detected in the detection region. In addition, first and second display contents are displayed on the display surface. In addition, the embodiments of the disclosure concern a control device having a display surface for displaying first and second display contents, a control element, a proximity sensing device with which an activation element can be detected in a detection region which is formed in the surroundings of the control element, and a control device for controlling the display content which is displayed on the display surface.

The method and the control device are, in particular, part of a motor vehicle. In particular, devices of a motor vehicle can be controlled by the method and the control device. However, the method and the control device can also be used in conjunction with other equipment, for example portable equipment, such as a music player, a cell phone or another mobile navigation system.

BACKGROUND

DE 10 2007 039 445 A1 discloses a method for displaying information by a display which is mounted in a motor vehicle, and a display device for a motor vehicle. In the method described in this document, there is a changeover from a display state into a control state if it has been detected that an object is approaching an input device. The display state is characterized, in particular, by the fact that no control buttons assigned to a control step are displayed. In contrast, in the control state such control buttons are displayed.

SUMMARY

It is desirable to display the information in the motor vehicle in such a way that it can be perceived quickly and intuitively by the driver so that the acquisition of the displayed information does not cause the driver to be distracted while driving. In addition, the control is to be capable of being carried out intuitively, easily and quickly in such a way that even when driving the driver can control the devices of the vehicle whose information is displayed by the display device, even if, where appropriate, complex hierarchical structures can be displayed by the display device. The display of information and the control associated with the display of information in the vehicle therefore contribute to the safety when the motor vehicle is being driven.

Embodiment of the present disclosure provide a method and a control device of the type mentioned at the beginning in which the control comfort for the user is improved and in which comprehensive information can be displayed to the user if the user does not activate the control device.

This is achieved according to the embodiments of the disclosure by a method and a control device as claimed.

BRIEF DESCRIPTION OF THE FIGURES

The embodiments of the disclosure will now be explained on the basis of an exemplary embodiment and with reference to the drawings, in which.

DETAILED DESCRIPTION

Figure 1:
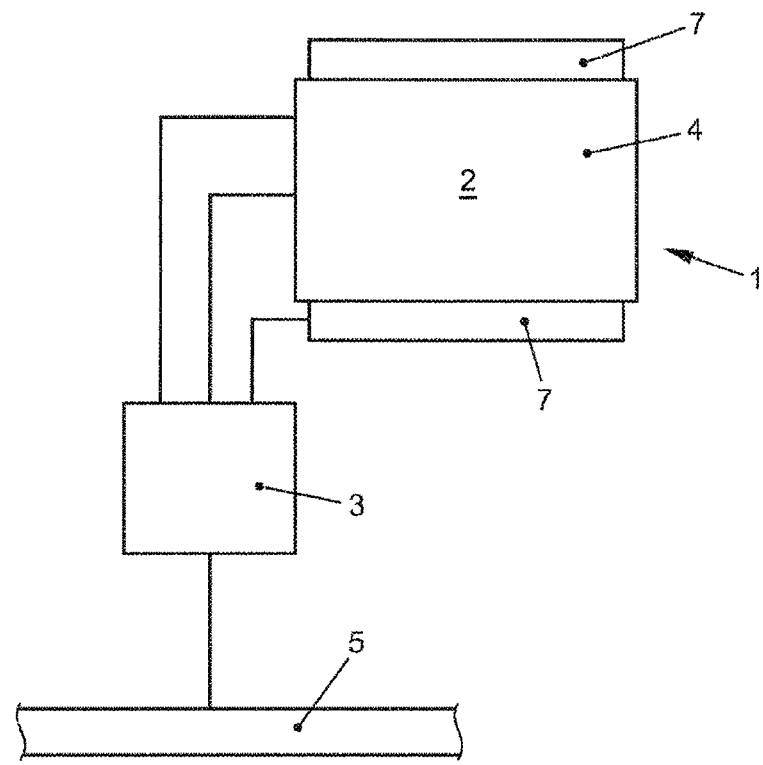
FIG. 1 is a schematic view of the design of an exemplary embodiment of the control device according to the embodiments of the disclosure in a plan view.

The method according to the embodiments of the disclosure is characterized in that the first display content is no longer displayed if an activation element has been detected in the detection region by the proximity sensing device. In such a situation it is assumed that the user will activate the control device with the activation element. Since in this case the first display content is no longer displayed in the method according to the embodiments of the disclosure, the second display content can be displayed in an enlarged fashion and can facilitate the user carrying out a control process which is assisted by the second display content. In this way, the control comfort for the user can be improved. In addition, instead of the first display content a third display content is displayed which can also assist the user in actuating the control device.

The activation element can be any desired element with which the control element can be activated. The activation element is, in particular, an activation pin or a user's fingertip.

The first display content comprises, in particular, status information. Such status information is employed, for example, in using the method according to the embodiments of the disclosure in a vehicle in order to continuously display to the vehicle occupants information which is relevant to driving the vehicle. For example, the status information can comprise the external temperature and the internal temperature in the vehicle, information as to whether traffic information is transmitted, information relating to communication links such as, for example, the cell phone provider and the reception strength in said provider's network, as well as information relating to interfaces with devices within the vehicle such as, for example, a radio link.

The first display content is displayed, in particular, independently of the second display content if no activation element is detected in the detection region by the proximity sensing device. The first display content can therefore comprise continuous information displays, while the second display content can comprise displays relating to changing applications. However, the continuous information displays of the first display content are removed from the screen if the user has the intention of activating the control element. In this way, a relatively large display region which can assist the user during the control process is formed on the display surface.

This is advantageous, in particular, when the method according to the embodiments of the disclosure is used in a vehicle since the size of the display surface in this case is relatively small and in addition a wide variety of information has to be displayed on the display surface.

According to one implementation of the method according to the embodiments of the disclosure, the display surface has a touch-sensitive surface. In this case, what is referred to as a touchscreen is made available as an input device. In this case, the control element can comprise a control button which is displayed on the display surface. In this case, the detection region is formed in front of the display surface. If the user therefore approaches, for example with his fingertip, the touch-sensitive surface on the display surface, his fingertip enters the detection region. This is detected by the proximity sensing device, after which the first display content is removed from the screen.

A control button is understood in the sense of the embodiments of the disclosure to be a controller element of a graphic user interface. A control button differs from elements and surfaces for pure information display, referred to as display elements or display surfaces, in that they can be selected. When a control button is selected, a function assigned to it is executed. The function can only give rise to a change in the information display. In addition, devices whose control is assisted by the information display can be controlled by the control buttons. The control buttons can therefore replace conventional mechanical switches. The control buttons can be generated and displayed as desired on a freely programmable display surface of a display. Furthermore, it is possible to provide that a control button can be marked. In this case, the assigned function is still not executed. However, the marked control button is illustrated in a highlighted fashion with respect to other control buttons. The marking and/or selection of a control button can be done by a cursor control process or by direct control of a touch-sensitive surface of the display.

In another implementation of the method according to the embodiments of the disclosure, the control element is arranged offset from the display surface. Said control element may be, for example, a mechanical one, in particular a turn and push switch in the center console of a vehicle with which a control process is possible. The control process by the offset control element can be assisted by the display on the display surface. For example, in this case it is also possible for control buttons which can be actuated by the offset control element to be displayed on the display surface. In this case, the detection region is formed around the offset control element.

According to one implementation of the method according to the embodiments of the disclosure, control buttons are displayed in an overlapping fashion in the second display region if no activation element is detected in the detection region by the proximity sensing device. On the other hand, the control buttons are not displayed in an overlapping fashion in the second display region if an activation element has been detected in the detection region by the proximity sensing device. This ensures that a large number of control buttons can be displayed if no activation intention of the user is detected. If such an activation intention is detected since the activation element has been detected in the detection region, the control buttons can, in contrast, be displayed in such a way that they are well delineated from one another and can therefore be easily activated by the user. This measure increases the control comfort for the user when the control buttons are being activated.

Furthermore, the first display content can be displayed in a transparent fashion if no activation element is detected in the detection region by the proximity sensing device. This ensures that the user can already detect transparent display surfaces or control buttons of the second display content by the first display content before he enters into the detection region with the activation element. This also increases the control comfort for the user.

According to a further implementation of the method according to the embodiments of the disclosure, the second display content is displayed at least partially enlarged if an activation element has been detected in the detection region by the proximity sensing device. If the second display content displays information which assists the user during the control process, this can enable this information to be perceived better by the user.

The display on the display surface with the first and second display content in a state in which no activation element has been detected in the detection region can correspond to a display state in which the displayed information is not assigned to any control steps. However, if an activation element has been detected in the detection region, the second display content which is now displayed alone can correspond to what is referred to as a control state in which information which is assigned to at least one executable control step is displayed. Only if an activation element has been detected in the detection region does the display content therefore change such that a control process can be carried out by the display content. For example, it is possible to switch over from a display surface into a control button which can be activated.

The control device according to the embodiments of the disclosure is characterized in that the control device is coupled to the proximity sensing device in such a way that the first display content is no longer displayed if an activation element has been detected in the detection region by the proximity sensing device.

The control device according to the embodiments of the disclosure is, in particular, embodied in such a way that it can partially or completely execute the method steps mentioned above. Said control device is integrated, for example, into a vehicle. In this case, various devices of the vehicle can be controlled by the control device. The control device according to the embodiments of the disclosure has the same advantages mentioned above as the method according to the embodiments of the disclosure.

According to one implementation of the control device according to the embodiments of the disclosure, the display surface has a touch-sensitive surface. The control element can in this case comprise a control button which is displayed on the display surface. In this case, the control element is therefore made available by what is referred to as a touchscreen. In this case, the detection region is formed in front of the display surface or in front of the touchscreen.

According to another implementation, the control element is arranged offset from the display surface. It may be, for example, a mechanical control element, for example a turn and push switch. However, the activation of this offset control element is assisted by the display on the display surface.

The proximity sensing device may comprise, for example, a reflection light barrier which comprises at least one lighting means for emitting electromagnetic detection radiation into the detection region and a receiver element for detecting a portion of the detection radiation which is scattered and/or reflected at the activation element. Said proximity sensing device can, in particular, be designed to detect the activation element in the detection region on the basis of the intensity of the received detection radiation. The proximity sensing device can also comprise various lighting means for the individual detection zones, which lighting means each emit electromagnetic detection radiation into the respective detection zone. In addition, a modulation device may be provided for modulating the emitted detection radiation, with the result that the detection radiation which is emitted into the individual detection zones differs in each case in respect of its modulation. In this case, the proximity sensing device can also comprise an analysis unit which is embodied in such a way that the received reflected and/or scattered detection radiation can be analyzed in terms of its modulation in order to determine in which detection zone the detection radiation has been scattered or reflected at an activation element. The stopping time of an activation element can thus be determined separately for each detection zone by the proximity sensing device.

The exemplary embodiment described below concerns the use of the control device and of the method in a vehicle, in particular a motor vehicle. Information can be displayed to the vehicle occupants by the control device and the method. In addition, the vehicle occupants can control devices of the vehicle and control the display by the control device. However, it is to be noted that the control device and the method can also be used in the same way in other equipment, such as for example mobile equipment.

The control device comprises a display device 1 with a display surface 2 which is arranged in the passenger compartment of the vehicle in such a way that it can be clearly seen by at least one vehicle occupant, in particular the driver. The display surface 2 can be made available by a display, in particular a liquid crystal display, of any desired design.

Furthermore, the display content can be projected onto the display surface 2. The display device 1 can therefore also be what is referred to as a head-up display or a head-down display.

The display device 1 is connected to a control device 3 with which graphic data for displaying information on the display surface 2 can be generated. The control device 3 is also connected to an input device 4 via which the user can control devices of the vehicle whose information is displayed on the display surface 2. The input device therefore constitutes a control element.

In the present exemplary embodiment, the input device 4 is made available by a touch-sensitive operator surface of the display surface 2. For example, a film can be arranged over the display surface 2 with which the position of contact by an activation element can be detected. The activation element may be, for example, a user's fingertip. The film may be embodied, for example, as a resistive touch film, capacitive touch film or piezoelectric film. In addition, the film may be embodied in such a way that a thermal current, which originates, for example, from a user's fingertip, is measured. Various inputs can be acquired from the profile of the contact with the film over time. For example, in the simplest case the contact with the film can be detected at a specific position and assigned to a graphic object displayed on the display surface 2. Furthermore, the length of contact at a specific position or within a specific region can be detected. A control button which can be activated can be displayed on the display surface 2 as a control element.

Instead of a touch-sensitive control surface, the input device 4 can also be formed by an offset control element. In this case, the activation of this control element can be assisted by the display on the display surface 2. However, in the text which follows it is assumed that a touch-sensitive surface is provided as the input device 4.

Figure 2:
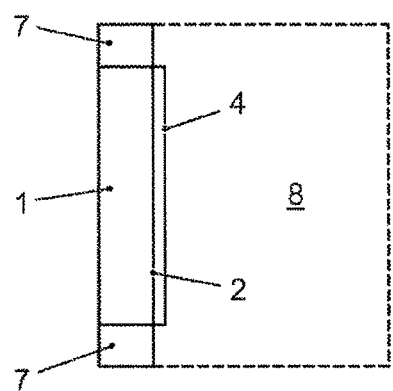
FIG. 2 shows the control device of the exemplary embodiment in a vertical sectional view.

Furthermore, the control device comprises a proximity sensing device 7. An activation element in a detection region 8 can be detected by the proximity sensing device 7. The detection region 8 is displayed in detail in FIG. 2. The detection region 8 is formed in such a way that the approaching of an activation element to the control surface 4 is detected.

In the exemplary embodiment described here, the detection region 8 forms at least a volume in front of the control surface 4. In particular a cube is formed which, with its lateral surfaces in the extent running parallel to the control surface 4, completely encloses the control surface 4. In a direction perpendicular to the control surface 4, the cube extends from the control surface 4 or directly in front of the control surface 4 up to a distance of, for example, approximately 40 cm. The distance of the outer limit of the detection region 8 in front of the control surface 4 is selected here in such a way that an object approaching the control surface 4 can be detected in good time such that the display on the display surface 2 can be changed early enough to assist the user in making an input. Furthermore, the distance between the detection region 8 and the control surface 4 should be selected such that the activation element or another object is moved into the detection region 8 as rarely as possible if a control process of the control surface 4 is not intended.

In the text which follows, various embodiments of the proximity sensing device 7 are explained:

According to a first implementation, the proximity sensing device emits electromagnetic detection radiation, preferably in the infrared wavelength range, into the detection region 8. The detection radiation suitably emerges in the vicinity of the display device 1 in such a way that it can detect the entire detection region 8. For example, a respective emission window, which is transparent to the detection radiation, can be arranged above and below the control surface 4. Lighting means for emitting the detection radiation are arranged behind the emission windows. The lighting means are, for example, light-emitting diodes which emit light in the infrared wavelength range. Furthermore, at least one receiver element is arranged behind the emission windows. The receiver element may be, for example, a photodiode. In order to prevent direct emission or capturing of stray radiation of the lighting means, a screen which comprises an entry opening is arranged over the receiver element. Underneath the screen there is, for example together with the receiver element, a reference lighting means which is preferably of identical design to the lighting means. This reference lighting means is provided to emit reference radiation in the same wavelength range or frequency range as the lighting means in an alternating fashion over time with respect to the lighting means. In this way, the background radiation in the vehicle can be compensated. A further optical device can be provided in front of the entry opening in the screen of the receiver element, which optical device focuses onto the receiver element the detection radiation of the lighting means which has been scattered and/or reflected at an activation element and which has passed through the emission window. The proximity sensing device also comprises actuation electronics for actuating the lighting means and the reference lighting means.

In an alternative embodiment of the proximity sensing device 7, radiofrequency signals are transmitted via the user's body and are used to detect the position of the user's fingertip and, if appropriate, to determine the user's position. In the user's seat, i.e. the driver's seat, there is an electrode arrangement. Radiofrequency signals are input into the user's body via this electrode arrangement. The input radiofrequency signals are received capacitively by sensors if the user approaches the sensors with his fingertip. The position of the user's fingertip in space, i.e. in particular in the detection region 8, can be determined on the basis of a plurality of sensors which are arranged at or behind the control surface 4, by triangulation and using the intensities of the signals extracted from the individual sensors. In this context it is not necessary for the control surface 4 or the sensors to be touched.

Furthermore, an identification code can be input capacitively into the user's body via the electrode arrangement and extracted from the sensors in the display device 1. An identification code, which indicates the control position from which the user is approaching the control surface 4, can therefore be transmitted via the user's body. If corresponding electrode arrangements are arranged both in the driver's seat and in the front seat passenger's seat, a signal which indicates whether the user of the activation element is the driver or the front seat passenger can be transmitted to the control device 3. This type of identification of the control position can also be used in conjunction with other implementations of the proximity sensing device 7. The basic principle of this configuration of the proximity sensing device 7 and further details of the transmission of signals are described in DE 10 2004 048 956 A1 and WO 2004/078536 A2.

In a further implementation of the proximity sensing device 7, the position of the activation element in the detection region 8 is detected as follows: a transmission and reception pattern is formed along a virtual line and is used to continuously scan the location of the activation element with a tightly bundled infrared light beam. In this context, the individual transmission locations along the virtual line are made to continuously output an individual infrared light pulse. If the transmission location is the last in the line, the first transmission location is then actuated again, with the result that the scanned infrared light beam repeatedly passes through the detection region 8 cyclically from one side to another. Depending on the transmission cycle of the infrared light pulses, the detection region 8 can therefore be scanned uninterruptibly and the position of the activation element detected. The measurement of the reflected infrared light pulse components is adapted to the cycle of the emitted infrared light pulses. The assignment to the individual transmission locations and/or to their incidence region determines here the reception characteristic of the measurement. Details of this determination of the position of an activation element are described in DE 100 58 244 C2.

Finally, the position of the activation element can also be determined by a camera system and a subsequent image processing as well as by an ultrasonic sensor system.

The proximity sensing device 7 transmits the current position of an activation element in the detection region 8 continuously to the control device 3. The control device 3 can change the display on the display surface 2 as a function of this signal.

Finally, the control device 3 is coupled to a vehicle bus 5. Via this vehicle bus 5, the control device 3 is connected to other devices of the vehicle on which information is to be displayed on the display surface 2 and which are to be controlled by the input device 4.

Figure 3A:
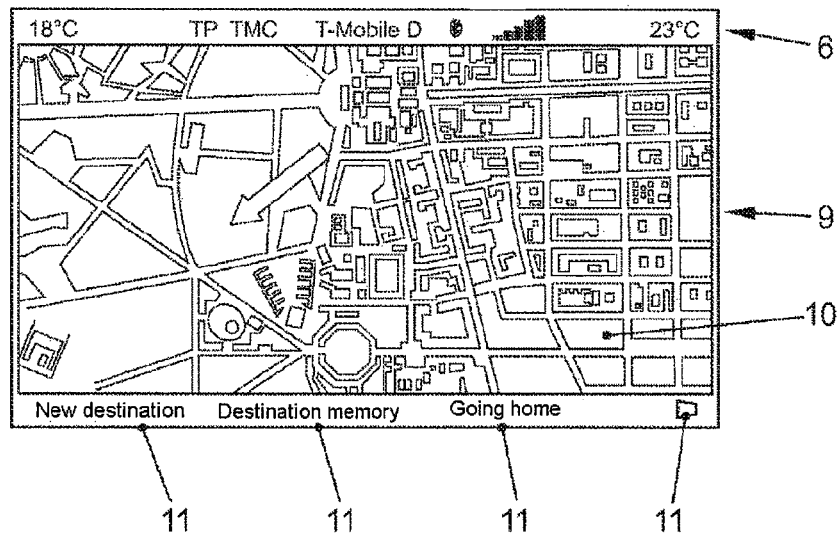
FIGS. 3A and 3B show views in a display state and a control state which are generated by an exemplary embodiment of the method according to the embodiments of the disclosure.
Figure 3B:
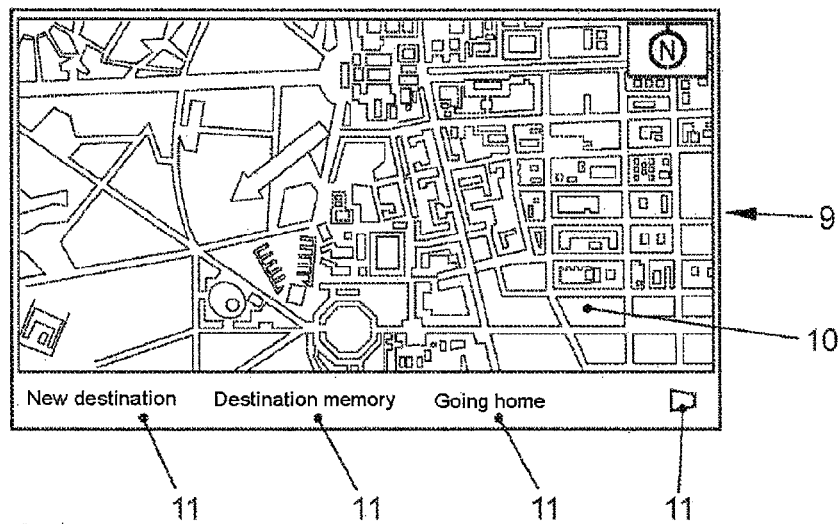

In the text which follows, an exemplary embodiment of the method according to the embodiments of the disclosure, which can be executed by the control device described above, is explained with reference to FIGS. 3 and 4 in detail:

In FIGS. 3A and 3B, displayed contents, which are generated by an exemplary embodiment of the method according to the embodiments of the disclosure, are shown on the display surface 2. FIG. 3A shows a display mode which indicates if an activation element is not being detected by the proximity sensing device 7 in the detection region 8. FIG. 3B shows a control mode which indicates if an activation element has been detected by the proximity sensing device 7 in the detection region 8.

In a display mode, a display bar 6 with status information relating to the external temperature, the reception of traffic information, the telecommunications provider, a Bluetooth connection, the reception strength of a radio interface and the internal temperature in the passenger compartment of the vehicle, are displayed in the upper part of the display surface 2. The display bar 6 forms a first display content.

Furthermore, a display region 9 with a second display content is displayed which displays the map of the navigation system in the example in the partial region 10 shown in FIG. 3A, and in a further display bar below the latter various display surfaces 11 of the control device are shown.

If the user then approaches the input device 4, i.e. for example the touch-sensitive surface of the display device 1, he moves, for example, his fingertip into the detection region 8. This is detected by the proximity sensing device 7, after which the latter transmits a corresponding signal to the control device 3. The control device 3 then actuates the display surface 2 in such a way that the first display content, i.e. the display bar 6, is no longer displayed. In addition, the second display content, i.e. the display region 9, is adapted to the larger available display surface. In addition, the display surfaces 11 are converted into control buttons 11 which can be activated. In this context, the control buttons 11 are displayed in a larger form in the control mode than the display surfaces 11 in the display mode. This increases the control comfort for the user since the user can more easily activate the control surfaces 11.

By activating the control surfaces 11, the user can navigate in the control system of the vehicle and cause, for example, other display contents to be displayed in the display region 10. After the user has terminated the activation and has removed the activation element from the detection region 8, the display surface 2 is switched back into the display mode, and in this case if appropriate a different display content is displayed in the display region 10. However, the status information displayed in the display bar 6 does not change, unless the user implements different specific settings in a setting menu, with which settings the displayed status information can be defined.

Figure 4A:
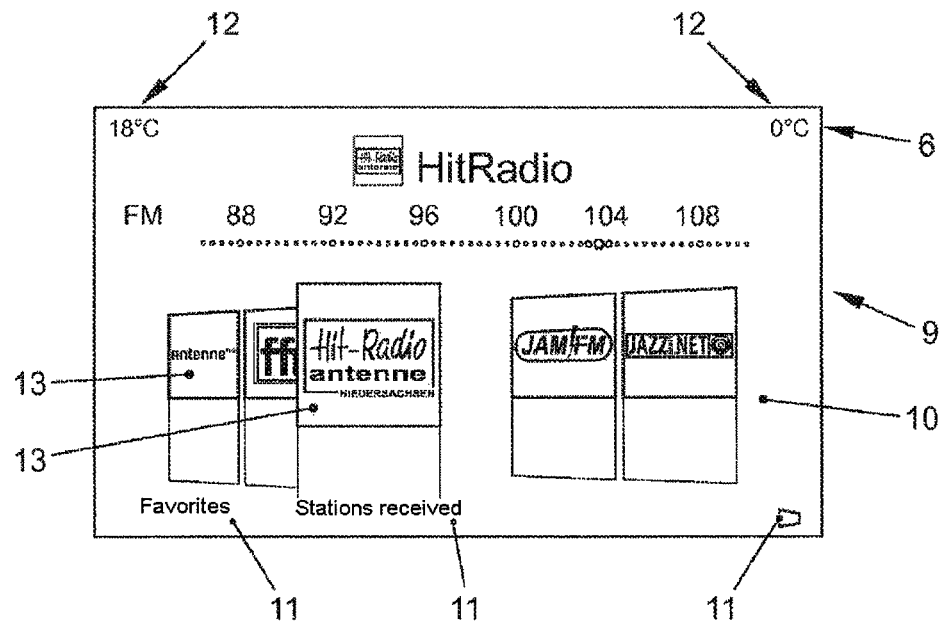
FIGS. 4A and 4B show further displays in a display state and a control state which are generated by an exemplary embodiment of the method according to the embodiments of the disclosure.
Figure 4B:
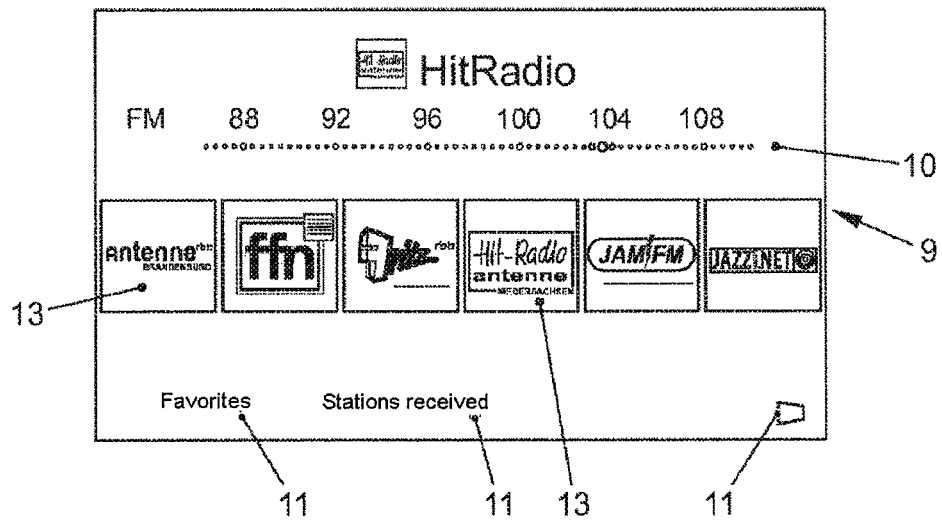

FIGS. 4A and 4B show a further example of a display in the display mode (FIG. 4A) and a display in the control mode (FIG. 4B) which are generated by the exemplary embodiment of the method according to the embodiments of the disclosure. In this case, the display surfaces 12 with the internal temperature and the external temperature are displayed in the display bar 6. Information relating to the vehicle's radio is displayed in the display region 10. Graphics 13, which can, if appropriate, be displayed in an overlapping fashion, are displayed for the individual radio transmitters. The currently set radio transmitter may be displayed, in particular, in the foreground, and other radio transmitters which can be received can be displayed in the background, represented by further graphics 13. The display surfaces 11 are displayed at the bottom of the display surface 2, as described above.

If an activation element has been detected in the detection region 8 by the proximity sensing device 7, the control device 3 switches the display on the display surface 2 into a control mode, as is illustrated in FIG. 4D. The display bar 6 with the status information disappears and the display surfaces 11 are converted into control buttons 11 and displayed in an enlarged form. In addition, the graphics 13 for the individual radio transmitters are no longer displayed in an overlapping form but rather one next to the other, with the result that they can be easily selected by the user. The graphics 13 can then also be embodied as control buttons which can be activated. The user can, for example, select a radio transmitter by touching the graphics 13 on the touch-sensitive surface of the display surface 2.

LIST OF REFERENCE NUMBERS

1 Display device
2 Display surface
3 Control device
4 Input device/control element
5 Vehicle bus
6 Display bar/first display content
7 Proximity sensing device
8 Detection region
9 Display region/second display content
10 (Partial) display region
11 Display surfaces/control buttons
13 Graphics

The invention claimed is:

1. A method for operating a control device in a vehicle, wherein the control device has a display surface and a control element, the method comprising:
monitoring a detection region formed in surroundings of the control element using a proximity sensing device to detect an activation element in the detection region;
displaying first and second display contents on the display surface; and
discontinuing display of the first display content in response to the detection of the an activation element in the detection region using the proximity sensing device,
wherein the detection of the activation element signals a user's intention to activate the control device, and
wherein, in response to the detection of the activation element in the detection region, the second display content is displayed in an altered manner in the display surface to facilitate the user carrying out a control input to the control device.

2. The method of claim 1, wherein the first display content comprises status information.

3. The method of claim 2, wherein the display surface has a touch-sensitive surface, the control element comprises a control button which is displayed on the display surface, and the detection region is formed in front of the display surface.

4. The method of claim 2, further comprising displaying control buttons in a non-overlapping fashion in the second display region if an activation element has been detected in the detection region by the proximity sensing device.

5. The method of claim 2, wherein the first display content is displayed in a transparent fashion if no activation element is detected in the display region by the proximity sensing device.

6. The method of claim 2, wherein the second display content is displayed in at least partially enlarged if an activation element has been detected in the detection region by the proximity sensing device.

7. The method of claim 1, wherein the first display content is displayed independently of the second display content if no activation element is detected in the detection region by the proximity sensing device.

8. The method of claim 1, wherein the display surface has a touch-sensitive surface, the control element comprises a control button which is displayed on the display surface, and the detection region is formed in front of the display surface.

9. The method of claim 1, further comprising displaying control buttons in a non-overlapping fashion in the second display region if an activation element has been detected in the detection region by the proximity sensing device.

10. The method of claim 1, wherein the first display content is displayed in a transparent fashion if no activation element is detected in the display region by the proximity sensing device.

11. The method of claim 1, wherein the second display content is displayed in at least partially enlarged if an activation element has been detected in the detection region by the proximity sensing device.

12. A control device for a vehicle, further comprising:
a display surface for displaying first and second display contents;
a control element;
a proximity sensing device that detects an activation element in a detection region formed in the surroundings of the control element; and
a control device controlling the display content which is displayed on the display surface,
wherein the control device is coupled to the proximity sensing device in such a way that the first display content is no longer displayed in response to the detection of the activation element in the detection region using the proximity sensing device,
wherein the detection of the activation element signals a user's intention to activate the control device, and
wherein, in response to the detection of the activation element in the detection region, the second display content is displayed in an altered manner in the display surface to facilitate the user carrying out a control input to the control device.

13. The control device of claim 12, wherein the display surface has a touch-sensitive surface, the control element comprises a control button which is displayed on the display surface, and the detection region is formed in front of the display surface.

14. The control device of claim 13, the control element is arranged offset from the display surface.

15. The control device of claim 12, wherein the control element is arranged offset from the display surface.

\* \* \* \* \*